(12) United States Patent
Ukawa

(10) Patent No.: US 7,423,664 B2
(45) Date of Patent: Sep. 9, 2008

(54) TRANSFLECTIVE LIQUID CRYSTAL DISPLAY DEVICE HAVING ALIGNMENT FILM COVERING PLURAL ISOLATED STACKS OF RESIN AND DIFFUSIVE REFLECTIVE PLATE LAYERS

(75) Inventor: Yusei Ukawa, Kobe (JP)

(73) Assignee: TPO Hong Kong Holding Limited, Shatin (HK)

( * ) Notice: Subject to any disclaimer, the term of this patent is extended or adjusted under 35 U.S.C. 154(b) by 217 days.

(21) Appl. No.: 10/535,754

(22) PCT Filed: Oct. 16, 2003

(86) PCT No.: PCT/IB03/04637

§ 371 (c)(1), (2), (4) Date: May 19, 2005

(87) PCT Pub. No.: WO2004/049051

PCT Pub. Date: Jun. 10, 2004

(65) Prior Publication Data

US 2006/0077321 A1    Apr. 13, 2006

(30) Foreign Application Priority Data

Nov. 22, 2002    (JP) .............................. 2002-339552

(51) Int. Cl.
*G02F 1/1335*    (2006.01)

(52) U.S. Cl. ........................................ 348/114; 349/112

(58) Field of Classification Search ......... 349/112–114, 349/86–94
See application file for complete search history.

(56) References Cited

U.S. PATENT DOCUMENTS

| | | | | |
|---|---|---|---|---|
| 5,629,784 A | * | 5/1997 | Abileah et al. | 349/112 |
| 5,831,698 A | * | 11/1998 | Depp et al. | 349/64 |
| 5,877,829 A | * | 3/1999 | Okamoto et al. | 349/74 |
| 6,195,140 B1 | * | 2/2001 | Kubo et al. | 349/44 |

FOREIGN PATENT DOCUMENTS

| | | |
|---|---|---|
| EP | 0 516 076 | 12/1992 |
| EP | 0516076 A2 | 12/1992 |
| JP | 10-123559 A | 5/1998 |

OTHER PUBLICATIONS

Patent Abstracts of Japan vol. 1998, No. 10, Aug. 31, 1998.

* cited by examiner

*Primary Examiner*—David C. Nelms
*Assistant Examiner*—John Heyman
(74) *Attorney, Agent, or Firm*—Birch, Stewart, Kolasch & Birch, LLP

(57) ABSTRACT

A transflective liquid crystal display device with a reflective mode using external light and a transmissive mode using a light source comprising a light source (11) used in the transmissive mode, a liquid crystal panel (12), arranged over the light source, for operating as display element and a diffusing optical element (13), arranged over the liquid crystal panel, for having a scattering state in the reflective mode and having a non-scattering state in the transmissive mode.

3 Claims, 4 Drawing Sheets

| Mode \ SW | SW1 | SW2 |
|---|---|---|
| Reflective | ON | OFF |
| Transmissive | OFF | ON |

TRANSFLECTIVE LIQUID CRYSTAL DISPLAY DEVICE HAVING ALIGNMENT FILM COVERING PLURAL ISOLATED STACKS OF RESIN AND DIFFUSIVE REFLECTIVE PLATE LAYERS

BACKGROUND OF THE INVENTION

1. Field of the Invention

The present invention relates to a transflective liquid crystal display device, particularly to a transflective liquid crystal display device for preventing interferences caused by reflecting light in a reflective mode and for improving contrast in a transmissive mode.

2. Description of Related Art

A so-called transflective liquid crystal display device, which reflects external light incident from the front side, guides it to the front side and at the same time allows incident light from a backlight system on the back to pass and guides it to the same front side, is entering into a full-fledged commercial stage. This type of liquid crystal display device provides effective image displays using principally external light (ambient light) when an environment in which it is used is bright (reflective mode) and principally self-emitted light from the backlight system when the environment is dark (transmissive mode).

A prior art document "Development of Advanced TFT with Good Legibility under Any Intensity of Ambient Light" (by M. Kubo, et al., IDW' 99, Proceedings of The Sixth International Display Workshops, AMD3-4, page 183-186, Dec. 1, 1999, sponsored by ITE and SID) discloses such a liquid crystal display device.

A reflective liquid crystal display device uses a diffusive reflective plate to efficiently transform incident light into reflecting light. This diffusive reflective plate normally has an uneven surface, capable of regularly reflecting incident light as well as adding the diffused/reflected component on this uneven surface to the reflecting light. Since the transflective liquid crystal display device includes a reflection area in pixels, it also uses a diffusive reflective plate.

In a transflective liquid crystal display device having a diffusive reflective plate, when incident light is reflected on the uneven surface of the diffusive reflective plate, different light rays in the same optical path direction are produced on one convex part of the uneven surface; light rays near the vertex of the convex part and light rays near the valley of the convex part, which interfere with one another causing a phenomenon of iridescence.

For this reason, in order to cause the light rays in the same optical path direction to have different optical path directions, the transflective liquid crystal display device having a diffusive reflective plate uses a polarizer subjected to anti-glare treatment or an adhesive glue (diffusive adhesive glue) having a diffusive characteristic.

However, the above described transflective liquid crystal display device has a problem that due to the polarizer subjected to anti-glare treatment or the adhesive glue having a diffusive characteristic, and a diffusive adhesive glue in particular, transmissive light is diffused in a transmissive mode and contrast in the transmissive mode is thereby reduced.

The present invention has been implemented in view of the above described problem and it is an object of the present invention to provide a transflective liquid crystal display device capable of preventing interferences caused by reflecting light in the reflective mode and improving contrast in the transmissive mode.

SUMMARY OF THE INVENTION

The transflective liquid crystal display device of the present invention is a transflective liquid crystal display device with a reflective mode using external light and a transmissive mode using a light source, comprising a light source used in the transmissive mode, a liquid crystal panel, arranged over the light source, for operating as display element and a diffusing optical element, arranged over the liquid crystal panel, for having a scattering state in the reflective mode and having a non-scattering state in the transmissive mode.

According to this arrangement, the diffusing optical element functions in a scattering state in the reflective mode, and can thereby diffuse light rays in the same optical path direction which may causes interferences produced on an uneven surface of a diffusive reflective plate in the reflective mode and thereby change their optical path directions and avoid a phenomenon of iridescence caused by interference of light rays. Furthermore, the diffusing optical element also functions in a non-scattering state in the transmissive mode, and can thereby prevent light from being diffused and prevent contrast from being reduced in the transmissive mode.

The transflective liquid crystal display device of the present invention preferably comprises switch controlling means for controlling to supply the diffusing optical element with power such that the diffusing optical element has a scattering state in the reflective mode and has a non-scattering state in the transmissive mode.

In the transflective liquid crystal display device of the present invention, the liquid crystal panel preferably has a pair of glass substrates sandwiching a liquid crystal layer and polarizer arranged on each glass substrate, wherein the diffusing optical element is arranged between one glass substrate and the polarizer arranged on the one glass substrate.

According to this arrangement, the glass substrate is not arranged on the top layer, which eliminates the need for forming an antireflective film on the surface of the glass substrate or applying antireflective treatment.

In the transflective liquid crystal display device of the present invention, the diffusing optical element preferably has a polymer dispersed liquid crystal or a polymer network liquid crystal.

BRIEF DESCRIPTION OF THE DRAWINGS

FIG. 7 is a view showing another switching table in the transflective liquid crystal display device according to Embodiment 1 and Embodiment 2 of the present invention.

DESCRIPTION OF THE PREFERRED EMBODIMENT(S)

With reference now to the attached drawings, embodiments of the present invention will be explained in detail below.

Embodiment 1

Figure 1:
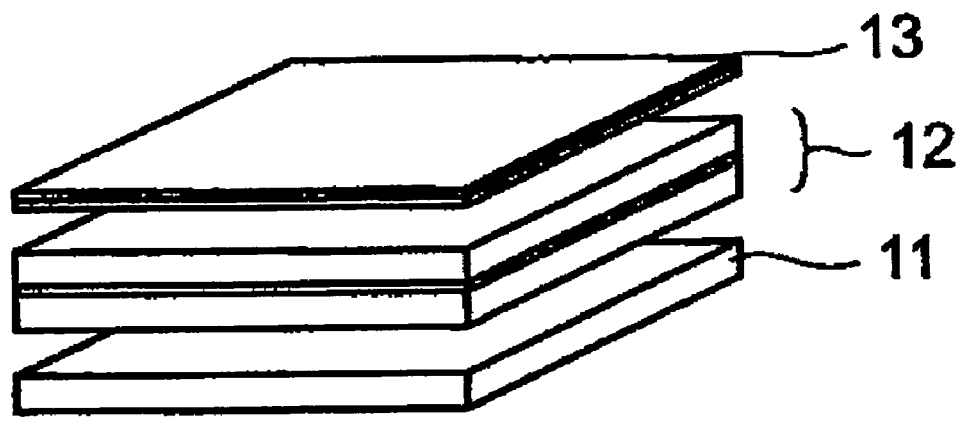
FIG. 1 is a view showing an arrangement of the transflective liquid crystal display device according to Embodiment 1 of the present invention.

This embodiment will describe an arrangement of a diffusing optical element arranged over a liquid crystal panel which can be changed such that it has a scattering state in a reflective mode and a non-scattering state in a transmissive mode. FIG. 1 is a view showing an arrangement of the transflective liquid crystal display device according to Embodiment 1 of the present invention.

The transflective liquid crystal display device shown in FIG. 1 is principally constructed of a backlight 11 which is a light source used in the transmissive mode, a liquid crystal panel 12 arranged over this backlight 11 for functioning as a display element and a diffusing optical element 13 which can be changed so as to have a scattering state in the reflective mode and a non-scattering state in the transmissive mode.

As the backlight 11, one used for a normal liquid crystal display device can be used.

As the liquid crystal panel 12, a liquid crystal panel used for a monochrome transmissive liquid crystal display device, for example, a TN (Twisted Nematic) liquid crystal panel or STN (Super Twisted Nematic) liquid crystal panel can be used. Furthermore, it is also possible to use an active matrix liquid crystal panel or various types of liquid crystal panels regardless of the liquid crystal type, driving method, alignment mode (for example, VA (Vertical Alignment), IPS (In Plane Switching), etc.). As the liquid crystal panel 12, for example, the liquid crystal panel whose arrangement is shown in FIG. 2 can be used.

Figure 2:
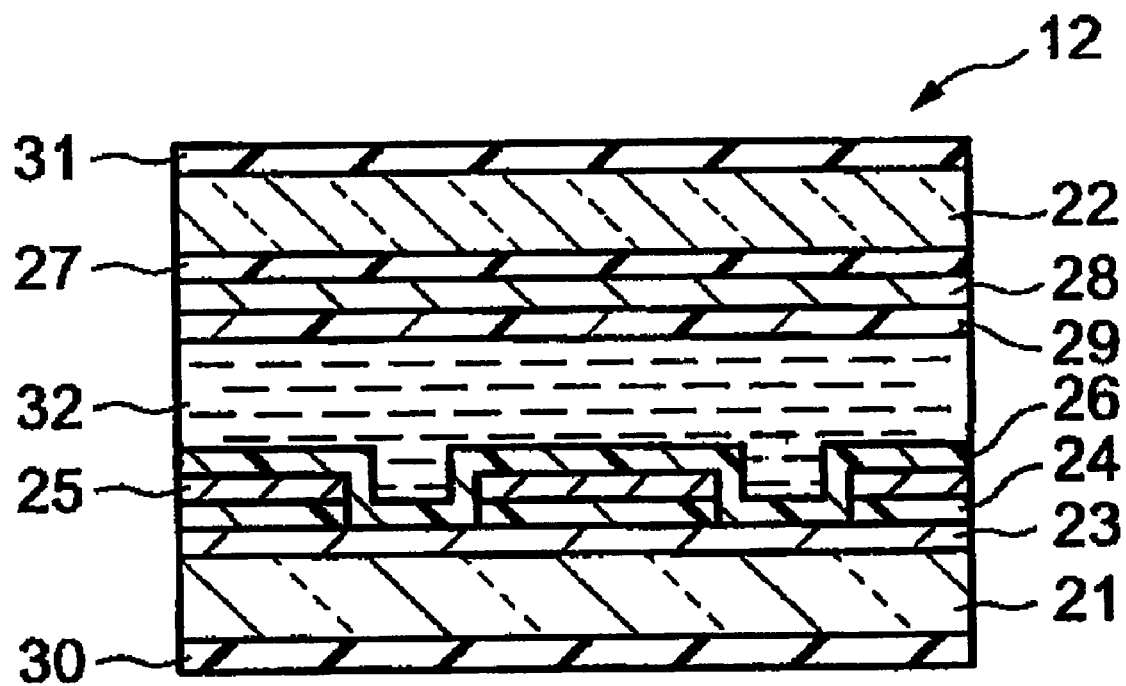
FIG. 2 is a sectional view showing an arrangement of the liquid crystal panel of the transflective liquid crystal display device according to Embodiment 1 of the present invention.

FIG. 2 is a sectional view showing an arrangement of the liquid crystal panel of the transflective liquid crystal display device according to Embodiment 1 of the present invention. A transparent electrode 23 is formed on one principal surface of one glass substrate 21. As the material of the transparent electrode 23, for example, ITO (Indium Tin Oxide), a zinc oxide based material, titanium oxide based material, indium oxide-zinc oxide based material, gallium added zinc oxide based material or a p-type oxide material, etc., can be used.

A resin layer 24 on which a transmission area in pixels is patterned is formed on the transparent electrode 23. As the material of the resin layer 24, a normal resist material such as polyimide can be used. A diffusive reflective plate 25 is formed on the resin layer 24. As the material of the diffusive reflective plate 25, aluminum or silver, etc., can be used. The diffusive reflective plate 25 is formed so as to have an uneven surface and can be formed, for example, by coarsening the base surface by etching, etc., or by patterning photosensitive resin to form unevenness.

The resin layer 24 and diffusive reflective plate 25 can be patterned as follows, for example. First, the resin layer is formed on the transparent electrode 23 and then a diffusive reflective plate is formed on the resin layer. Then, a resist layer is formed on the diffusive reflective plate, patterned using a photolithographic method and the diffusive reflective plate is etched using the patterned resist layer as a mask. Then, the resin layer is etched using the patterned diffusive reflective plate as a mask. In this way, the resin layer 24 and diffusive reflective plate 25 are formed. Here, the case where the resin layer and diffusive reflective plate are laminated, the diffusive reflective plate and the resin layer are etched in that order and then patterned has been explained, but according to the present invention it is also possible to laminate and pattern the resin layer first and then laminate and pattern the diffusive reflective plate.

An alignment film 26 is formed on the diffusive reflective plate 25 and the transparent electrode 23 in the transmission area. As the alignment film 26, a resin material such as polyimide can be used.

A color filter 27 is formed on one principal surface of the other glass substrate 22. A transparent electrode 28 is formed on the color filter 27 and an alignment film 29 is formed on the transparent electrode 28. As the material of the transparent electrode 28 and the alignment film 29, the same material as that of the glass substrate 21 can be used.

The transparent electrodes 23 and 28 of the glass substrates 21 and 22 form a matrix of scanning electrodes and signal electrodes to allow displays. This allows pixels to be formed in the liquid crystal panel 12 as with a normal liquid crystal panel. As the method of forming the transparent electrodes 23 and 28, a method used in manufacturing a normal liquid crystal display device, for example, a sputtering method can be used. As the method of forming the alignment films 26 and 29, a method used in manufacturing a normal liquid crystal display device, for example, a method including an application step, drying step and rubbing step, etc., can be used.

A liquid crystal layer 32 is formed between the glass substrates 21 and 22. The liquid crystal layer 32 is formed by arranging the glass substrates 21 and 22 whose films have been formed in such a way that the alignment films 26 and 29 face each other and injecting a liquid crystal material (here, TN liquid crystal) between the glass substrates 21 and 22. A polarizer 30 is arranged on the other principal surface of the glass substrate 21 and a polarizer 31 is arranged on the other principal surface of the glass substrate 22.

For the polarizers, it is possible to use a combination of a plurality of optical films such as a phase difference film or optical film for visual angle compensation or a polarizer made up of a single optical film.

As the diffusing optical element 13, a polymer network liquid crystal display element or a polymer dispersed liquid crystal display element can be used. For example, the polymer network liquid crystal display element having an arrangement shown in FIG. 3 can be used.

Figure 3:
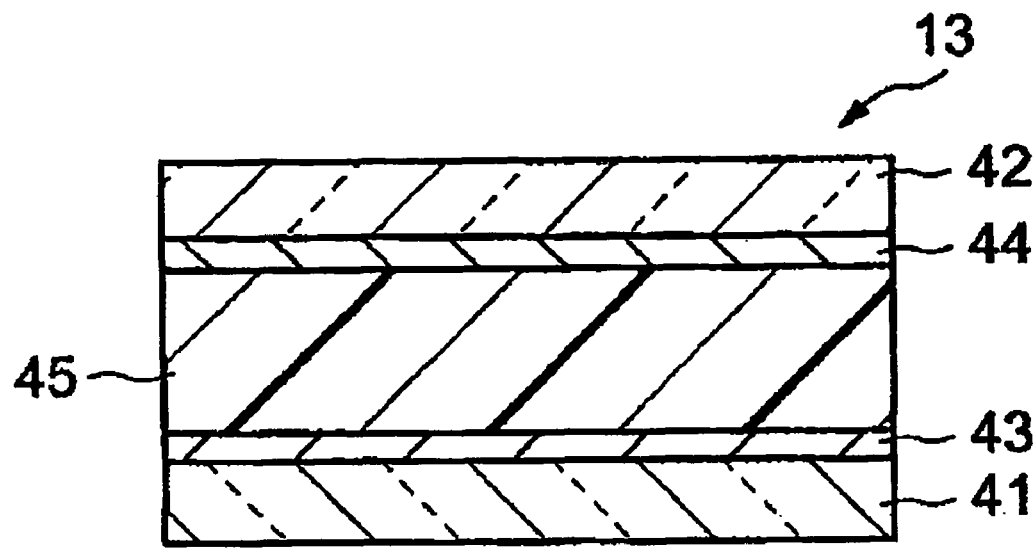
FIG. 3 is a sectional view showing an arrangement of the diffusing optical element of the transflective liquid crystal display device according to Embodiment 1 of the present invention.

FIG. 3 is a sectional view showing an arrangement of the diffusing optical element of the transflective liquid crystal display device according to Embodiment 1 of the present invention. A transparent electrode 43 is formed on one principal surface of one glass substrate 41. Furthermore, a transparent electrode 44 is formed on one principal surface of the other glass substrate 42. As the method of forming the transparent electrodes 43 and 44, a method used for manufacturing a normal liquid crystal display device can be used. Furthermore, as the material of the transparent electrodes 43 and 44, the same material as that used for the above described liquid crystal panel 12 can be used. As the method of forming them, the method used for manufacturing a normal liquid crystal display device can be used.

A polymer liquid crystal layer 45 is formed between the glass substrates 41 and 42. The polymer liquid crystal layer 45 is sandwiched between the glass substrates 41 and 42 arranged in such a way that the transparent electrodes 43 and 44 face each other.

As the polymer liquid crystal layer 45, a polymer network liquid crystal made up of a network including liquid crystal molecules which extends in a polymer matrix or a polymer dispersed liquid crystal made up of droplets including liquid crystal molecules dispersed in a polymer matrix can be used. From the standpoint of a low driving voltage, the polymer network liquid crystal is advantageous.

The above described liquid crystal panel 12 and diffusing optical element 13 are arranged as shown in FIG. 1, in the order of the backlight 11, liquid crystal panel 12 and diffusing optical element 13. In such an arrangement, the liquid crystal panel 12 functions as a display element in either mode and the diffusing optical element 13 is controlled to have a scattering state in the reflective mode and a non-scattering state in the transmissive mode.

Figure 4:
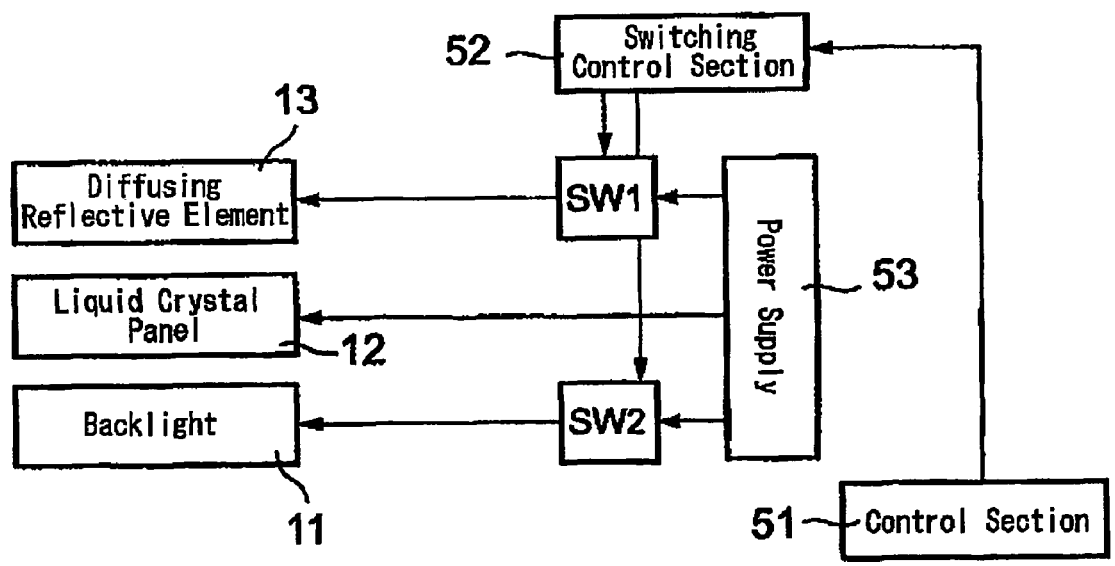
FIG. 4 is a block diagram showing an arrangement of the transflective liquid crystal display device according to Embodiment 1 of the present invention.

FIG. 4 is a block diagram showing an arrangement of the transflective liquid crystal display device according to Embodiment 1 of the present invention. This arrangement includes a control section 51 which controls the overall apparatus, the backlight 11, the liquid crystal panel 12, a switching control section 52 which controls switching of voltage application to the optical element 13 and a power supply 53 which supplies power for voltage application. Furthermore, this arrangement includes switches SW1 and SW2 for switching control. Furthermore, the switching control section 52 includes a switching table shown in FIG. 5 and performs switching control based on this switching table.

Then, the operation of the transflective liquid crystal display device according to this embodiment with the above described arrangement will be explained.

The control section 51 automatically sets a display mode (reflective mode or transmissive mode) based on an input from the user or situation of the environment (brightness and light quantity, etc.) and outputs the mode information to the switching control section 52. In the reflective mode, the switching control section 52 controls SW1 and SW2 in such a way that SW1 and SW2 switch the power supply so as to use external light and use the diffusing optical element 13 in a scattering state, and in the transmissive mode, SW1 and SW2 switch the power supply so as to use light of the backlight 11 and use the diffusing optical element 13 in a non-scattering state.

Figures 5, 6:
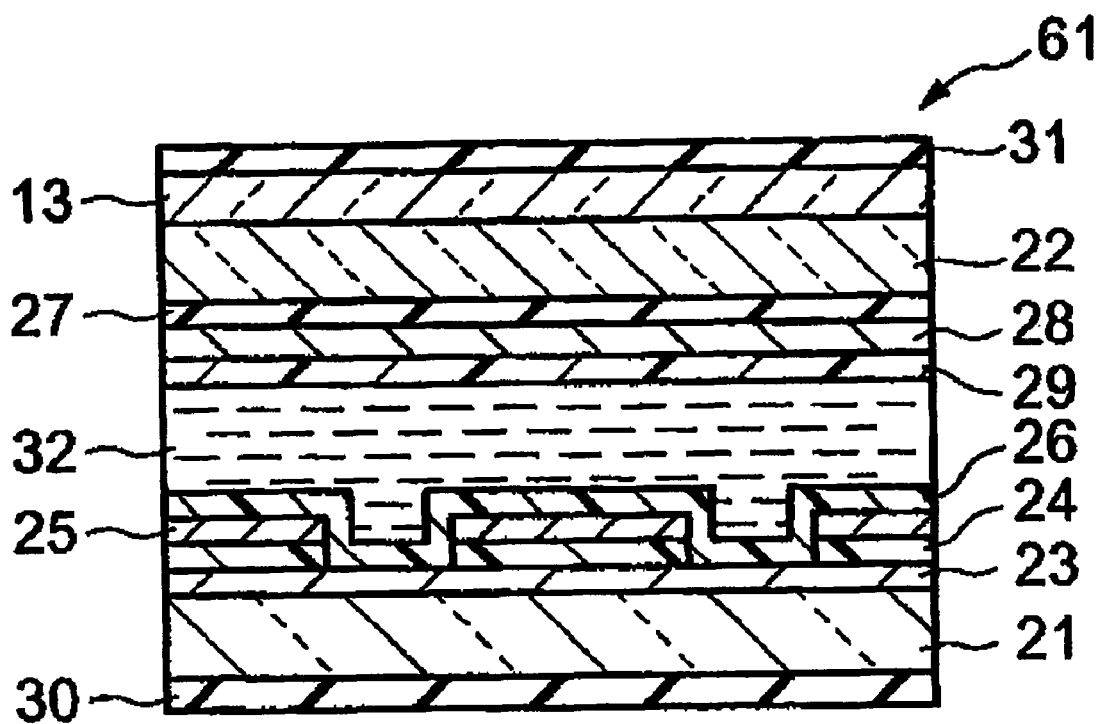
FIG. 5 is a view showing a switching table in the transflective liquid crystal display device according to Embodiment 1 and Embodiment 2 of the present invention.
FIG. 6 is a sectional view showing an arrangement of the liquid crystal panel of the transflective liquid crystal display device according to Embodiment 2 of the present invention.

First, the case in the reflective mode will be explained. In the reflective mode, more specifically as shown in FIG. 5, SW1 is set to the OFF position to use the diffusing optical element 13 in a scattering state. Since external light is used in this reflective mode, no power is supplied to the backlight 11. Therefore, SW2 is also set to the OFF position.

In such a condition, displays are performed with power supplied from the power supply 53 to apply a voltage to the liquid crystal panel 12. In this case, incident light, which is external light, passes through the diffusing optical element 13, reaches the liquid crystal panel 12, is efficiently reflected by the diffusive reflective plate 25 of the liquid crystal panel 12 to become reflecting light and passes through the diffusing optical element 13 from the liquid crystal panel 12 to the outside. At this time, incident light is regularly reflected by the diffusive reflective plate 25 and at the same time the uneven surface of the diffusive reflective plate 25 adds a diffused/reflected component to the reflecting light. When the incident light is reflected by the uneven surface of the diffusive reflective plate 25, light rays in the same optical path direction are produced on one convex part of the uneven surface; light rays near the vertex of the convex part and light rays near the valley of the convex part. Since the diffusing optical element 13 is in a scattering state, when these light rays in the same optical path direction pass through the diffusing optical element 13, they are diffused and thereby have different optical paths. In this way, the reflecting light that has passed through the diffusing optical element 13 is free of interference and produces no phenomenon of iridescence. As a result, it is possible to maintain high display quality as the liquid crystal display device.

Then, the case in the transmissive mode will be explained. In the transmissive mode, more specifically as shown in FIG. 5, SW1 is set to the ON position so that the diffusing optical element 13 is set in a non-scattering state to allow the light of the backlight 11 to pass. Furthermore, since no external light is used in this transmissive mode, power is supplied to the backlight 11. Thus, SW2 is also set to the ON position.

In this condition, displays are performed with power supplied from the power supply 53 to apply a voltage to the liquid crystal panel 12. In the transmissive mode, since the diffusing optical element 13 is in a no-scattering state, the light from the backlight 11 which has passed through the liquid crystal panel 12 is allowed to go outside. In this way, it is possible to prevent contrast from being reduced in the transmissive mode. Furthermore, the transmissive mode is assumed to be used in a place with less external light, and therefore interference in the diffusive reflective plate 25 has no influence on the display quality.

In this way, in the transflective liquid crystal display device according to Embodiment 1, the diffusing optical element functions in a scattering state in the reflective mode, and can thereby diffuse light rays in the same optical path direction produced on the uneven surface of the diffusive reflective plate in the reflective mode which may cause interference so as to make their optical path directions differ from one another and avoid a phenomenon of iridescence due to interference of light rays. Furthermore, the diffusing optical element functions in a non-scattering state in the transmissive mode, and therefore light is not diffused in the transmissive mode and it is possible to prevent contrast from being reduced. Furthermore, in the transflective liquid crystal display device according to Embodiment 1, the diffusing optical element 13 is arranged over the liquid crystal panel 12, and therefore the polarization state of the liquid crystal panel 12 is not affected.

Embodiment 2

This embodiment will describe an arrangement with the diffusing optical element 13 incorporated in the liquid crystal panel 12. FIG. 6 is a sectional view showing an arrangement of the liquid crystal panel of the transflective liquid crystal display device according to Embodiment 2 of the present invention. In FIG. 6, the same parts as those in FIG. 2 are assigned the same reference numerals and detailed explanations thereof will be omitted.

A diffusing optical element 13 is arranged on the other principal surface of a glass substrate 22 of a liquid crystal panel 61 shown in FIG. 6, that is, on the principal surface opposite the principal surface on which a color filter 27 is provided. The arrangement of the diffusing optical element 13 is the same as that shown in FIG. 3. A polarizer 31 is arranged on the diffusing optical element 13.

The operation of the transflective liquid crystal display device according to this embodiment having the above described arrangement is substantially the same as that of Embodiment 1. First, the case in the reflective mode will be explained. In the reflective mode, more specifically as shown in FIG. 5, SW1 is set to the OFF position to use the diffusing optical element 13 in a scattering state. Since external light is used in this reflective mode, no power is supplied to the backlight 11. Therefore, SW2 is also set to the OFF position.

In such a condition, displays are performed with power supplied from the power supply 53 to apply a voltage to the liquid crystal panel 61. In this case, incident light, which is external light, passes through the diffusing optical element 13 of the liquid crystal panel 61, is efficiently reflected by the diffusive reflective plate 25 to become reflecting light and passes through the diffusing optical element 13 from the liquid crystal panel 61 to the outside. At this time, incident light is regularly reflected by the diffusive reflective plate 25 and at the same time the uneven surface of the diffusive reflective plate 25 adds a diffused/reflected component to the reflecting light. When the incident light is reflected by the uneven surface of the diffusive reflective plate 25, light rays in the same optical path direction are produced on one convex part of the uneven surface; light rays near the vertex of the convex part and light rays near the valley of the convex part. Since the diffusing optical element 13 is in a scattering state, when these light rays in the same optical path direction pass through the diffusing optical element 13, they are diffused and thereby have different optical paths. In this way, the reflecting light that has passed through the diffusing optical element 13 is free of interference and produces no phenomenon of iridescence. As a result, it is possible to maintain high display quality as the liquid crystal display device.

Then, the case in the transmissive mode will be explained. In the transmissive mode, more specifically as shown in FIG. 5, SW1 is set to the ON position so that the diffusing optical element 13 is set in a non-scattering state to allow the light of the backlight 11 to pass. Furthermore, since no external light is used in this transmissive mode, power is supplied to the backlight 11. Thus, SW2 is also set to the ON position.

In this condition, displays are performed with power supplied from the power supply 53 to apply a voltage to the liquid crystal panel 61. In the transmissive mode, since the diffusing optical element 13 is in a no-scattering state, the light from the backlight 11 which has passed through the liquid crystal panel 61 is allowed to go outside. In this way, it is possible to prevent contrast from being reduced in the transmissive mode. Furthermore, external light in the transmissive mode is reduced, and therefore interference in the diffusive reflective plate 25 has no influence on the display quality.

In this way, in the transflective liquid crystal display device according to Embodiment 2, the diffusing optical element functions in a scattering state in the reflective mode, and can thereby diffuse light rays in the same optical path direction produced on the uneven surface of the diffusive reflective plate in the reflective mode which may cause interference so as to make their optical path directions differ from one another and avoid a phenomenon of iridescence due to interference of light rays. Furthermore, the diffusing optical element functions in a non-scattering state in the transmissive mode, and therefore light is not diffused in the transmissive mode and it is possible to prevent contrast from being reduced. Furthermore, in the transflective liquid crystal display device according to Embodiment 2, the glass substrate of the diffusing optical element 13 is not arranged on the top layer, and therefore it is not necessary to form any antireflective film on the surface of the glass substrate or apply antireflective treatment.

The present invention is not limited to above described Embodiments 1 and 2, but can be implemented modified in various ways. For example, Embodiments 1 and 2 have described the case where a passive liquid crystal display element is used as a liquid crystal panel used as the display element, but an active matrix liquid crystal display element can also be used in the present invention.

Furthermore, Embodiments 1 and 2 have described the case where a polymer network liquid crystal is used as the diffusing optical element, but the present invention is also applicable to a case where polymer dispersed liquid crystal is used as the diffusing optical element. Furthermore, as the diffusing optical element in the present invention, it is possible to use not only the diffusing optical element using the polymer network liquid crystal or polymer dispersed liquid crystal but also a diffusing optical element capable of electrically controlling the switching between a state in which light is allowed to pass and a state in which light is diffused.

Furthermore, Embodiments 1 and 2 above have described the case where the diffusing optical element 13 arranged in such a way that the polymer liquid crystal layer 35 is sandwiched between the glass substrates is used, but the present invention is also applicable to a case where the diffusing optical element 13 is a film which does not use any glass substrate. In this case, it is possible to paste it to the liquid crystal panel and thereby simplify the manufacturing process.

Furthermore, Embodiments 1 and 2 have described the case where the diffusing optical element 13 is controllable so as to have a scattering state when no voltage is applied and have a non-scattering state (transparent) when a voltage is applied, but the present invention is also applicable to a case where the diffusing optical element is controllable so as to have a non-scattering state (transparent) when no voltage is applied and have a scattering state when a voltage is applied. In this case, as shown in FIG. 7, switching control is performed in such a way that SW1 is set to the ON position and SW2 is set to the OFF position in the reflective mode and SW1 is set to the OFF position and SW2 is set to the ON position in the transmissive mode. In this mode, power consumption can be reduced in the transmissive mode, which is preferable when importance is attached to the transmissive mode.

The present invention can provide sufficiently bright displays in both the transmissive mode and reflective mode, and is therefore applicable to all kinds of liquid crystal display devices used in an external environment such as cellular phone and PDA (information portable terminal) or liquid crystal display devices mounted on vehicles or airplanes.

As described above, the present invention provides a transflective liquid crystal display device with a reflective mode using external light and a transmissive mode using a light source, comprising a light source used in the transmissive mode, a liquid crystal panel, arranged over the light source, for operating as display element and a diffusing optical element, arranged over the liquid crystal panel, for having a scattering state in a reflective mode and having a non-scattering state in a transmissive mode, and can thereby prevent interferences caused by reflecting light in the reflective mode and improve contrast in the transmissive mode.

This application is based on Japanese Patent Application No. 2002-339552 filed on Nov. 22, 2002, entire content of which is expressly incorporated by reference herein.

The invention claimed is:

1. A transflective liquid crystal display device with a reflective mode using external light and a transmissive mode using a light source comprising:
   a light source used in the transmissive mode;
   a liquid crystal panel, arranged over said light source, said liquid crystal panel operating as a display element; and
   a diffusing optical element, arranged over said liquid crystal panel, said diffusing optical element having a scattering state in said reflective mode and having a non-scattering state in said transmissive mode;

wherein said liquid crystal panel has a pair of glass substrates sandwiching a liquid crystal layer and a polarizer is arranged on each of said pair of glass substrates, wherein said diffusing optical element is arranged between an upper glass substrate of said pair of glass substrates and said polarizer arranged on said upper glass substrate;

wherein said liquid crystal layer and a lower glass substrate of said pair of glass substrates sandwich a continuous transparent electrode on the lower glass substrate, a plurality of isolated stacks on the continuous transparent electrode, and an alignment film covering the isolated stacks and the continuous transparent electrode, and wherein each of the isolated stacks comprises a resin layer and a diffusive reflective plate thereon.

2. The device according to claim 1, further comprising switch controlling means for controlling to supply said diffusing optical element with power such that said diffusing optical element has a scattering state in said reflective mode and has a non-scattering state in said transmissive mode.

3. The device according to claim 1, wherein said diffusing optical element has a polymer dispersed liquid crystal or a polymer network liquid crystal.

* * * * *